US012640958B2

(12) United States Patent
Hosemann

(10) Patent No.: US 12,640,958 B2
(45) Date of Patent: May 26, 2026

(54) METHOD AND NODE OF A DATA NETWORK FOR FORWARDING DATA CONTENT

(71) Applicant: Inventio AG, Hergiswil (CH)

(72) Inventor: Axel Hosemann, Auw (CH)

(73) Assignee: INVENTIO AG, Hergiswil (CH)

( * ) Notice: Subject to any disclaimer, the term of this patent is extended or adjusted under 35 U.S.C. 154(b) by 311 days.

(21) Appl. No.: 18/550,690

(22) PCT Filed: Mar. 23, 2022

(86) PCT No.: PCT/EP2022/057670
§ 371 (c)(1),
(2) Date: Sep. 15, 2023

(87) PCT Pub. No.: WO2022/200455
PCT Pub. Date: Sep. 29, 2022

(65) Prior Publication Data
US 2024/0223399 A1     Jul. 4, 2024

(30) Foreign Application Priority Data
Mar. 23, 2021     (EP) ..................................... 21164158

(51) Int. Cl.
*H04L 12/413*          (2006.01)
*H04L 47/24*           (2022.01)
(52) U.S. Cl.
CPC ............. *H04L 12/413* (2013.01); *H04L 47/24* (2013.01)

(58) Field of Classification Search
CPC .............................. H04L 12/413; H04L 47/24
See application file for complete search history.

(56) References Cited

U.S. PATENT DOCUMENTS

| | | |
|---|---|---|
| 2004/0008709 A1 | 1/2004 | Einbinder |
| 2017/0070564 A1 | 3/2017 | Sas |
| 2018/0314219 A1* | 11/2018 | Gamroth .............. G05B 19/042 |
| 2020/0048035 A1* | 2/2020 | Dayasagar .............. B66B 1/468 |

FOREIGN PATENT DOCUMENTS

| | | |
|---|---|---|
| DE | 19756564 A1 | 6/1998 |
| DE | 10215720 A1 | 10/2003 |
| EP | 1124351 A2 | 8/2001 |
| WO | 03107609 A1 | 12/2003 |
| WO | 2021004835 A1 | 1/2021 |

* cited by examiner

*Primary Examiner* — Clayton R Williams
(74) *Attorney, Agent, or Firm* — Shumaker, Loop & Kendrick, LLP

(57)                ABSTRACT

A method for forwarding data content from a second data connection and a third data connection of a node of a data network to a first data connection of the node, wherein data content received at the second data connection has priority over data content received at the third data connection, includes interrupting forwarding of data content received via the third data connection as soon as reception of data content at the second data connection is detected. The data content received at the second data connection is fed into an intermediate buffer (memory) and the output of the data content received via the second data connection, via the first data connection, is delayed for a definable time period.

13 Claims, 3 Drawing Sheets

12 FIELD PROGRAMMMABLE GATE ARRAY  14 FIRST INTERFACE
16 FIRST PHY  26 SECOND INTERFACE  28 SECOND PHY  37 MEMORY
38 THIRD INTERFACE  48 FOURTH INTERFACE  54 FIELD DEVICE
56 MICROCONTROLLER  58 DATA INTERFACE  60 DOOR CONTACT
62 DATA INTERFACE  63 LOGIC SWITCH 10, 10.1, 10.n NODE  54 OPERATING UNIT  60 DOOR CONTACT  78 ELEVATOR CAR
80 COUNTERWEIGHT  82 DRIVE MACHINE  88 ELEVATOR CONTROLLER
90 SHAFT DOOR  92 MASTER

METHOD AND NODE OF A DATA NETWORK FOR FORWARDING DATA CONTENT

FIELD

The invention relates to a method for forwarding data content and to a node of a data network.

BACKGROUND

Data networks having a plurality of nodes are used in particular to exchange data or signals between different devices or machines. In this context, a data network can be understood to mean an amalgamation of various technical, primarily independent electronic systems such as computers, sensors, actuators, agents and other electronic components, the amalgamation allowing the individual systems to communicate with one another. The aim here may be a shared use of resources. The communication typically takes place using predefined protocols which, among other things, specify the way in which data content is to be structured and transmitted. The data content is usually embedded as user data in a so-called data telegram with a structure specified by the protocol.

For example, field devices arranged in a distributed manner in a data network can exchange data with a central controller and/or with one another via a data network. In this case, the field devices can be integrated into the data network directly (i.e. immediately) or via a node of the data network (i.e. indirectly). Each of the field devices can, for example, have a sensor and/or an actuator. Measurement data recorded by the sensor or other signals can then be transmitted to the controller via the data network. Alternatively or in addition, data can be transmitted from the controller to the sensor or an actuator, for example in the form of control signals.

The term "field device" is to be understood here very generally. It is to be understood to mean any device connected directly or indirectly to a data network, to which data can be transmitted or from which data can be received. A field device can thus also be designed, for example, as an operating unit of an elevator system for calling an elevator and/or for entering a destination floor. Such an operating unit transmits data in the form of the input of a user and receives data, which are output, for example, via a display. For example, information about the selected floor, but also graphics, images or video sequences, can be presented. A field device can also be designed, for example, as a display which only receives and displays information.

WO 2021/004835 A1 describes a method and a data network comprising nodes for communicating data content, in particular in an elevator system. WO 2021/004835 A1 deals primarily with the fast and secure transmission of safety-relevant data in an elevator system. However, it does not discuss in more detail how, in addition to the safety-relevant data, further data can be transmitted such as from and to control units or to displays of the elevator system.

SUMMARY

In contrast, it is an object of the invention in particular to propose a method and a node of a data network for forwarding data content, which enables a transmission of different data content in a data network while simultaneously ensuring fast and secure transmission of prioritized data content.

This object is achieved according to the invention by a method and by a node of a data network as described below.

In the following, possible embodiments of nodes of a data network, a data network, and a method are described, in order to forward and thus communicate data content with the nodes and thus in the data network, using the example of a data network in an elevator system. It should be pointed out, however, that embodiments of the nodes described herein, of the data network, and of the method that can be carried out therewith can also be used in various other applications. The approach described herein is particularly suitable for applications in which a large number of field devices and/or safe input/output units are to communicate with a controller, and the field devices and/or safe input/output units are arranged at a relatively large distance from one another.

The described embodiments relate equally to the method for forwarding data content from a second data connection and a third data connection of a node of a data network to a first data connection of the node, and to the node itself. In other words, method steps mentioned below for example with reference to the method can also be implemented as features of the node, and vice versa. The node is thus configured in particular such that it can carry out the described methods and/or the described methods can be carried out using the node.

In the method according to the invention for forwarding data content from a second data connection and a third data connection of a node of a data network, in particular an elevator system, to a first data connection of the mentioned node, first data telegrams, forming first data content, can be output via the first data connection, according to the Ethernet protocol, second data telegrams, forming second data content, can be received via the second data connection, according to the Ethernet protocol, third data telegrams, forming third data content, can be received via the third data connection, according to the Ethernet protocol, and seventh data content can be received via a fourth data connection of the node.

Data content is embedded as what is known as payload data, in what is known as a data telegram, the structure of the data telegram being specified by a protocol.

In this case, a first data telegram that is output via the first data connection and forms first data content is derived either from a second data telegram or a third data telegram. This means that a received second data telegram is output either identically or modified as the first data telegram, or a received third data telegram is output either identically or modified as the first data telegram. The first data telegram therefore does not result from the second and the third data telegram. The third data telegram is in particular output identically, that is to say without modifications, to the first data telegram. Depending on the application, the second data telegram can be output in modified form as the first data telegram. In particular, data content can be integrated into the second data telegram before output.

The method further comprises the following method steps carried out in the stated sequence:

interrupting the forwarding of data content received via the third data connection as soon as reception of a second data telegram via the second data connection is detected, routing the received second data telegram into an intermediate buffer, and delaying the output of data content received via the second data connection from the intermediate buffer, via the first data connection, for a definable period of time.

In other words, in the method for forwarding data content from the second data connection and the third data connection, i.e. during the forwarding of data content received at the third data connection, a data telegram also being received at the second data connection, the forwarding of the data content received via the third data connection is interrupted.

In the method according to the invention, when forwarding second data content received via the second data connection to the first data connection, the received seventh data content is integrated without delay into first data telegrams output via the first data connection.

In this way, further data content can advantageously be integrated into the prioritized transmission of the second data content without delay. This is particularly advantageous if the seventh data content relates to safety-relevant data. The mentioned delay-free integration of the seventh data content is realized in particular according to the method described in WO 2021/004835 A1.

In an embodiment of the method according to the invention, in particular also eighth data content can be output via the fourth data connection. In this case, in particular seventh data content can be received and eighth data content can be output simultaneously. The fourth data connection is thus in particular full-duplex-capable.

The fourth data connection is designed in particular as what is known as a Serial Peripheral Interface (SPI), which enables fast and reliable data transmission. The fourth data connection is in particular connected to a safe sensor or a safe actuator, and thus to a safe input/output unit, which fulfills safety-critical functions. Such an input/output unit is also referred to as a "Safe I/O". The fourth data connection can be connected, for example, to a safe door contact of an elevator system, which fulfills the safety-critical function of detecting a closed state of an elevator door.

In this case, the first and second data connections of the node are in particular constructed in two parts. A first, outer part receives an analog signal via a transmission medium, in particular via a cable, and, upon identification of reception of a data telegram, converts the content of the data telegram into a digital signal. This digital signal, representing a data telegram, is transmitted, together with further signals necessary for the data transmission according to the Ethernet protocol, to a second, inner part of a data connection, in order to be forwarded from there for further processing. The inner part can also be referred to as a "MAC" or "Host". For output of data telegrams, corresponding digital signals are transmitted from the inner part to the outer part, in order then to be output as an analog signal. The outer part of a data connection is thus dependent on the transmission medium used, whereas the inner part is independent of the transmission medium.

The outer part of the first and second data connection of the node is in particular designed in each case as what is known as a PHY. A PHY is a special integrated circuit which is responsible for encoding and decoding data between a purely digital system and a modulated analog system. PHY stands for physical interface or physical layer.

The inner part of the first and second data connection of the node is in particular implemented in each case as what is known as a "Media-independent Interface" (MII) or "Reduced Media-independent Interface" (RMII).

As soon as the outer part of the second data connection detects the reception of a second data telegram, it transmits, in addition to the data telegram, as a further signal, a signal indicating reception of data, i.e. a receive signal, to the inner part of the second data connection. The mentioned further signal is referred to in particular as the RX_DV signal (abbreviation of "Receive data valid"). If a receive signal is forwarded from the inner part of the second data connection and a part of a first data telegram corresponding to the third data telegram has already been output via the first data connection, the output of this first data telegram is immediately interrupted when the forwarding of the third data content is interrupted. The output of the partially forwarded third data telegram is repeated in particular later.

The second data telegram received via the second data connection is not output directly via the first data connection, but is guided into an intermediate buffer, that is to say a temporary memory of the node, whereby at least a part of the second data telegram is stored in the intermediate buffer. The intermediate buffer is in particular designed as what is known as a First In-First Out (FIFO) memory or register. The parts of the second data telegram which were first guided into the intermediate buffer are thus also first to be removed again from the intermediate buffer. In this case, the intermediate buffer is selected in particular to be so large that it can receive the part of the second data telegram to be stored. After the expiry of the mentioned predefinable time period, output of the data content of the part of the second data telegram stored in the intermediate buffer, as the first data telegram, via the first data connection, begins. This takes place irrespective of whether the second data telegram has already been read in completely.

The delay in outputting data content, received via the second data connection, from the intermediate buffer, via the first data connection, has the effect that a temporal gap results between the first data telegram, originating from a third data telegram and partially output via the first data connection, and the first data telegram, originating from the second data telegram and output via the first data connection. This gap is necessary so that individual first data telegrams are differentiated from one another and can thus be correctly received by a receiving node that receives the first data telegrams.

The method according to the invention thus advantageously allows for output of data content from a field device connected to the node via the third data connection, via the first data connection, and at the same time transmission of data content received via the second data connection and having a higher priority, which data content is forwarded in a secure manner and having a guaranteed, minimum time delay, and thus output via the first data connection. This is advantageous in particular when the second data content comprises safety-relevant data, the forwarding of which must be guaranteed within a predetermined time for safe operation of the system comprising the nodes, in particular an elevator system.

The third data telegram of which the transmission has been interrupted via the first data connection is not lost when the method according to the invention is used. According to the Ethernet protocol, an interrupted output of a data telegram is repeated from the beginning, as soon as the output is possible again. After the output of the data content of a second data telegram, on the basis of which the output of the data content of the third data telegram was interrupted, the aborted output of the data content of the third data telegram is therefore repeated. The output is repeated, in particular after waiting for a random waiting time after recognition that neither first data telegrams are output via the first data connection nor second data telegrams are received via the second data connection. This behavior is defined in the Ethernet protocol used or is predefined in the event of collisions in the case of half-duplex transmission.

The node has in particular what is known as a "Field Programmable Gate Array" (FPGA), i.e. an integrated circuit of digital technology, into which a logic circuit can be loaded. A desired circuit structure of the node can thus be predefined. The above-described inner parts of the first and second data connections are realized on the FPGA. The FPGA can send and receive data telegrams according to Ethernet protocol via the two data connections. In this case, the inner part of the first data connection can be regarded as a first interface, and the inner part of the second data connection can be regarded as a second interface of the FPGA.

A third interface, which forms the third data connection of the node, is realized on the FPGA. The interface is also implemented in particular as a "Media-independent Interface" (MII) or a "Reduced Media-independent Interface" (RMII). The FPGA can send and receive data telegrams according to the Ethernet protocol via the third interface. The third interface of the FPGA thus receives digital signals and outputs digital signals. The digital signals are transmitted, for example, via conductor tracks or via a plug connection between electronic components.

From the point of view of an electronic device connected to the node via the third data connection, for example a microcontroller of a field device, the node thus represents a PHY, via which the electronic device can receive and output data telegrams via a MAC or Host, in particular in the form of a "Media-independent Interface" (MII) or "Reduced Media-independent Interface" (RMII), via the first data connection of the node.

It is also possible for the node to have an integrated circuit which has the circuit structure configured in the FPGA and has the stated interfaces.

The output of first data telegrams via the first data connection and the reception of second data telegrams at the second data connection takes place in particular according to the Ethernet Standard IEEE802.3bw 100BASE-T1, which is also referred to as an automotive Ethernet. The analog transmission runs via an unshielded, twisted, two-core cable ("Unshielded-Single-Twisted-Pair" cable) having a data transmission rate of 100 Mbit/s. The cable can be regarded as a data communication path connecting different nodes.

The data transmission via the third data connection is also carried out in particular in accordance with Ethernet Standard, having a data transmission rate of 100 Mbit/s.

The above-mentioned object is also achieved by a node of a data network comprising a first data connection, a second data connection, a third data connection and a fourth data connection, the node being configured to, output first data telegrams, forming first data content, via the first data connection, according to the Ethernet protocol, receive second data telegrams, forming second data content, via the second data connection, according to the Ethernet protocol, and receive third data telegrams, forming third data content, via the third data connection, according to the Ethernet protocol, receive seventh data content via the fourth data connection, derive a first data telegram either from a second data telegram or a third data telegram, interrupt the forwarding of data content received via the third data connection as soon as the node detects reception of a second data telegram via the second data connection, route the received second data telegram into an intermediate buffer, delay the output of data content received via the second data connection from the intermediate buffer via the first data connection for a definable period of time, and integrate without delay, during forwarding of second data content received via the second data connection to the first data connection to the first data connection, received seventh data contents into first data telegrams output via the first data connection.

In an embodiment of the method according to the invention, the transmission and/or reception of data content at the first, second and third data connection takes place at the same transmission rate, and the mentioned time period before the output of data content, received via the second data connection, from the intermediate buffer, via the first data connection corresponds to at least a minimum waiting time of the Ethernet type used by the first data connection and by the second data connection.

Adherence to this time period guarantees that there is such a spacing, between a first data telegram, which is partially output via the first data connection and which contains third data content and the output of which has been interrupted, and a first data telegram output after the expiry of the time period, that these two telegrams can be reliably recognized as two separate data telegrams, in accordance with the Ethernet protocol used, and can be correctly received by a receiving node receiving the data telegrams. This ensures a secure transmission of the second data content.

The mentioned time period is in particular exactly the mentioned minimum waiting time. This additionally enables the fastest possible transmission of the second data content. The mentioned time period can also be minimally longer than the mentioned minimum waiting time.

In the Ethernet protocol, the mentioned minimum waiting time (Interpacket Gap, IPG) is in principle 96 bit times. A bit time is the transmission duration of a bit. When using the Ethernet standard IEEE802.3bw 100BASE-T1 having a data transmission rate of 100 Mbit/s, the minimum waiting time is thus 0.92 µs.

The length of the mentioned time period has a direct effect on the size of the intermediate buffer into which a received second data telegram is routed. The intermediate buffer must be at least as large as the data volume that can be transmitted or received in the mentioned time period. The intermediate buffer therefore has to be at least 96 bits or 12 bytes in size, in a time period of 96 bit times. The intermediate buffer is in particular exactly 96 bits or 12 bytes in size.

In an embodiment of the method according to the invention, either third data telegrams can be received or fourth data telegrams can be output via the third data connection at a point in time. Thus, data content is transmitted via the third data connection in what is known as the half-duplex method according to the Ethernet protocol. This enables a very simple and cost-effective realization of the method.

The third data connection is in particular connected to a microcontroller of a field device. Such microcontrollers usually have an interface in the form of a "Media-independent Interface" (MII) or a "Reduced Media-independent Interface" (RMII) having half-duplex functionality. Such microcontrollers are commercially available in various embodiments and inexpensively.

In an embodiment of the method according to the invention, the third data connection is connected to a first external data interface of a first field device for data transmission. In order to interrupt the forwarding of data content received via the third data connection, as soon as reception of a second data telegram is detected via the second data connection, a receive signal is output via the third data connection to the first external data interface. This receive signal indicates an output of fourth data telegrams from the third data connection to the first external data interface, whereby a collision during the data transmission between the third data connection and the first external data interface is detected according to the Ethernet protocol used, and the aforementioned data transmission at the third data connection is stopped.

Thus, the transmission of third data telegrams from the first external data interface can be interrupted very easily. As already described above, the third data telegram sent during the termination is therefore not lost, but, as soon as an output of first data protocols via the first data connection of the node is again possible, is automatically transmitted completely again from the first external data interface.

The receive signal is in particular output to the first external data interface until the output of the second data content, received via the second data connection, via the first data connection is completed.

Data transmission between the external data interface of the first field device and the third data connection of the node is to be understood here as the exchange of third and fourth data telegrams. In addition, further signals necessary for the correct sequence of data transmission, such as the aforementioned receive signal, can be replaced.

When the third data connection is implemented as a "Media-independent Interface" (MII), the receive signal output from the third data connection to the first external data interface is referred to as a CRS signal, and when the third data connection is implemented as a "Reduced Media-independent Interface" (RMII) the signal is referred to as a RX_DV signal.

The external data interface of the first field device can also be indirectly connected to the third data connection. For example, the third data connection can be connected to a converter to form a USB connection, to which the external data interface of the first field device is connected.

In an embodiment of the method according to the invention, a jam signal sent from the first external data interface to the third data connection according to the Ethernet protocol used, which characterizes a collision in the data transmission between the third data connection and the first external data interface, is not output via the first data connection. The jam signal is therefore not forwarded by the FGPA to the first data connection. In the FPGA, a (logical) switch is configured for this purpose, by means of which a connection from the third to the first data connection can be interrupted.

As stated above, a minimum waiting time must be maintained between data telegrams according to the Ethernet protocol, the jam signal also being intended to be regarded as a data telegram. The output of the jam signal received via the third data connection would thus delay the start of the output of the second data content of the second data telegram routed into the intermediate buffer. The suppression of the output of the jam signal thus enables a particularly fast transmission of the second data content.

In an embodiment of the method according to the invention, in addition to transmitting the first data telegrams, the first data connection simultaneously also receives fifth data telegrams, and, in addition to receiving the second data telegrams, the second data connection simultaneously also outputs sixth data telegrams. In this case, fifth data telegrams received via the first data connection are output without changes as sixth data telegrams via the second data connection.

Thus, data content is transmitted in what is known as the full-duplex method, according to the Ethernet protocol, via the first and the second data connection. Furthermore, only second data content received via the second data connection, which are output via the first data connection, can be modified.

The fifth data telegrams received via the first data connection are output in particular via the third data connection as fourth data telegrams. A large amount of data can thus be transmitted very easily via the third data connection to a field device connected there.

The described methods for forwarding data content from a second data connection and a third data connection of a node of a data network to a first data connection of the mentioned node can be used particularly advantageously in a method for communicating data content within a data network, the data network in particular being part of an elevator system.

In such a method for communicating data content within a data network, the data network having a plurality of nodes connected to one another via data communication paths, each having a first data connection and a second data connection, in order to exchange data telegrams, forming data content, between the nodes, the nodes being connected in series with one another via the data communication paths and the first data terminals, and the second data terminals being connected to one another in series to form a chain extending from a first node to a last node, at least two nodes being connected via a respective third data connection to a first external data interface of a respective field device, and via a respective fourth data connection to a respective safe input/output unit for data transmission, second data content received by the second data connection, third data content received by the third data connection, and fourth data content received by the fourth data connection are forwarded, by means of a method described above for forwarding data content, into a node connected to a first field device for data transmission and to a safe input/output unit.

The above-described node, according to the invention, of a data network can be used particularly advantageously in a data network, the data network in particular being part of an elevator system.

In such a data network, in particular an elevator system, the data network having a plurality of nodes connected to one another via data communication paths, each having a first data connection and a second data connection, in order to exchange data telegrams, forming data content, between the nodes, the nodes being connected in series with one another via the data communication paths and the first data terminals, and the second data terminals being connected to one another in series to form a chain extending from a first node to a last node, at least two nodes are designed as a node according to the invention described above.

An elevator system comprising such a data network has the advantage that data content can be transmitted quickly and securely.

Further advantages, features and details of the invention can be found in the following description of embodiments and with reference to the drawings, in which like or functionally like elements are provided with identical reference signs. The drawings are merely schematic and are not to scale.

DETAILED DESCRIPTION

Figure 1:
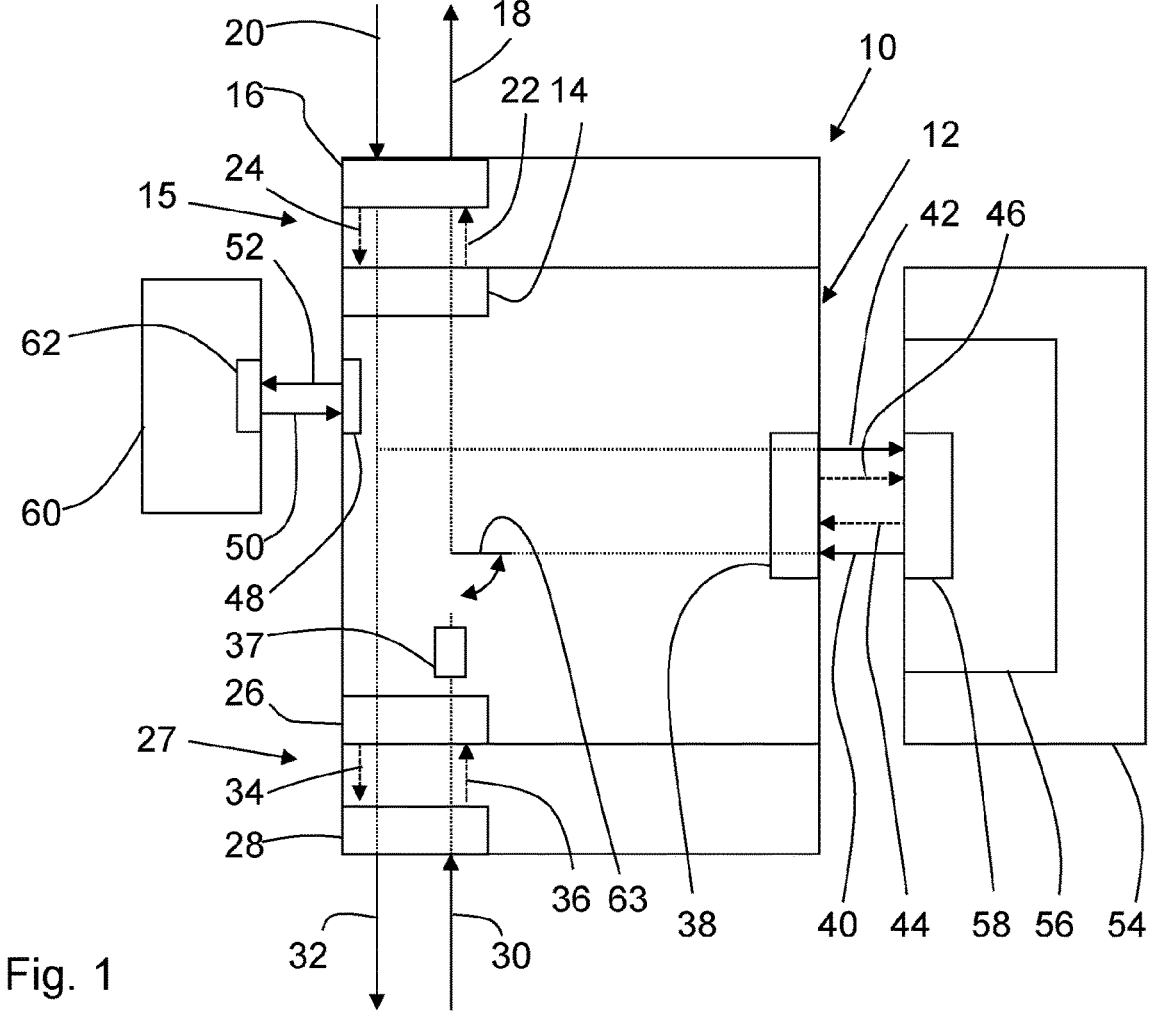
FIG. 1 shows a node of a data network connected to a field device and a safe input/output unit.

According to FIG. 1, a node 10 of a data network (74 in FIG. 3) (not shown in FIG. 1) has a "Field Programmable Gate Array" (FPGA) 12. The FPGA 12 has a first interface 14, which is implemented as a full-duplex-capable "Reduced Media-independent Interface" (RMII). The first interface 14 forms an inner part of a first data connection 15 of the node 10. The first interface 14 is connected to an outer part 16 of the first data connection 15 of the node 10, which is formed by what is known as a PHY. The outer part 16 of the first data connection 15 is referred to below as the first PHY 16. In accordance with the Ethernet standard IEEE802.3bw 100BASE-T1, the first PHY 16 can output first data telegrams, and simultaneously receive fifth data telegrams, via a connected unshielded twisted, two-core cable ("Unshielded-Single-Twisted-Pair" cable) (94 in FIG. 3). The first data connection 15 can thus transmit and receive data telegrams according to the Ethernet protocol in the full-duplex method. First data telegrams are represented symbolically as an outgoing arrow 18 and fifth data telegrams are represented symbolically as an incoming arrow 20. In addition to the data telegrams 18, 20, further signals necessary for the data transmission according to the Ethernet protocol are exchanged between the first interface 14 and the first PHY 16. Further signals transmitted from the first interface 14 to the first PHY 16 are symbolically shown as a dashed arrow 22, and the further signals received by the first interface 14 from the first PHY 16 are symbolically shown as a dashed arrow 24.

The FPGA 12 also has a second interface 26, which is implemented analogously to the first interface 14. The second interface 26 is connected to a second PHY 28, implemented analogously to the first PHY 16, of a second data connection 27 of the node 10. The second PHY 28 can receive second data telegrams and simultaneously output sixth data telegrams, via a connected unshielded twisted two-core cable (94 in FIG. 3) according to the Ethernet Standard IEEE802.3bw 100BASE-T1. The data transmission rate is thus 100 Mbit/s. Second data telegrams are represented symbolically as an incoming arrow 30 and sixth data telegrams are represented symbolically as an outgoing arrow 32. The second data connection 27 can thus transmit and receive data telegrams according to the Ethernet protocol in the full-duplex method. In addition to the data telegrams 30, 32, further signals necessary for the data transmission according to the Ethernet protocol are transmitted and received. In addition to the data telegrams 30, 32, further signals necessary for the data transmission according to the Ethernet protocol are exchanged between the second interface 26 and the second PHY 28. Further signals transmitted from the second interface 26 to the second PHY 28 are symbolically shown as a dashed arrow 34, and the further signals received by the second interface 26 from the second PHY 28 are symbolically shown as a dashed arrow 36.

The FPGA 12 has a memory 37, or a memory 37 is configured in the FPGA 12. The memory 37 is configured as what is known as a First In-First Out (FIFO) memory or register, and can accommodate 12 bytes. The FPGA 12 is configured such that a second data telegram 30, received by the second data connection 27, can be temporarily stored in the memory 37, at least in part. Data content of a second data telegram 30 stored first in the memory 37 are also the first to be removed from the memory 37.

The FPGA 12 also has a third data connection 38, which is designed as a third interface. The third interface, and thus the third data connection 38, is realized as a half-duplex capable "Reduced Media-independent Interface" (RMII). The third data connection 38 can receive third data telegrams and can output fourth data telegrams, according to the Ethernet standard, at a data transmission rate of 100 Mbit/s, in digital form. Since the third data connection is half-duplex-capable, simultaneous receiving of third data telegrams and outputting of fourth data telegrams is not possible, but rather, at a point in time, either third data telegrams are received or fourth data telegrams are output. Third data telegrams are represented symbolically as an incoming arrow 40 and fourth data telegrams are represented symbolically as an outgoing arrow 42. In addition to the data telegrams 40, 42, further signals necessary for the data transmission according to the Ethernet protocol are transmitted and received. The received further signals are symbolically represented as a dashed incoming arrow 44, and the transmitted further signals are represented symbolically as a dashed outgoing arrow 46.

The FPGA 12 also has a fourth data connection 48, which is designed as a fourth interface. The fourth interface, and thus the fourth data connection 48, is implemented as a full-duplex-capable Serial Peripheral Interface (SPI). Via the fourth data connection 48, seventh data telegrams can be received and eighth data telegrams can be output simultaneously. Seventh data telegrams are represented symbolically as an incoming arrow 50, and eighth data telegrams are represented symbolically as an outgoing arrow 52. In this case, the fourth data connection 48 can be used in the full or half-duplex method.

It is also possible for the node to be designed as an integrated circuit having the described data connections. It is also possible for the FPGA, and thus the node, to have no fourth data connection, but only a first, second and third data connection.

The node 10 is connected to a field device 54 via the third data connection 38. The field device 54 can be designed, for example, as an operating unit (see FIG. 3) of an elevator system for calling an elevator and/or for inputting a destination floor. The field device 54 has a microcontroller 56 having a data interface 58 implemented as a half-duplex-capable "Reduced Media-independent Interface" (RMII). The data interface 58 is connected to the third data connection 38 of the node 10 via a direct plug connection. It can thus output third data telegrams 40 to the third data connection 38 and receive fourth data telegrams 42 from the third data connection 38 of the node 10. In addition, the further signals 44 can be output and the further signals 46 can be received.

The node 10 is connected via the fourth data connection 48 to a safe input/output unit 60, which can be designed, for example, as a safe door contact (see FIG. 3) of an elevator system. The input/output unit 60 has a data interface 62 designed as a full-duplex-capable Serial Peripheral Interface (SPI). The data interface 62 is connected to the fourth data connection 48 of the node 10. It can thus output seventh data telegrams 50 to the fourth data connection 48 and receive eighth data telegrams 52 from the fourth data connection 48 of the node 10. In this case, the data interface 62 can be used in the full- or half-duplex method.

If the node 10 is integrated in a data network (74 in FIG. 3), it is then connected to a further network subscriber via the first data connection. The further network subscriber can in particular be an identically constructed node which is in particular likewise connected to a field device and a safe input/output unit. In this case, the first data connection is connected to the second data connection of the further node. The further network subscriber can also be designed as a control unit or a differently constructed node. It simply also has to have a data connection which, according to the Ethernet standard IEEE802.3bw 100BASE-T1, can output and receive data telegrams in the full-duplex method.

In the event that the node 10 is integrated in a data network (74 in FIG. 3) and it is not the last node in a chain of nodes, then it is connected via the second data connection to a first data connection of an identically designed further node, the further node being in particular likewise connected to a field device and a safe input/output unit.

The node 10 or the FPGA 12 are configured such that fifth data telegrams 20 received from the first data connection 15 are output directly and without modifications as sixth data telegrams 32 from the second data connection 27. It is therefore not possible for the node 10 to output information generated by it via the second data connection.

Figure 2:
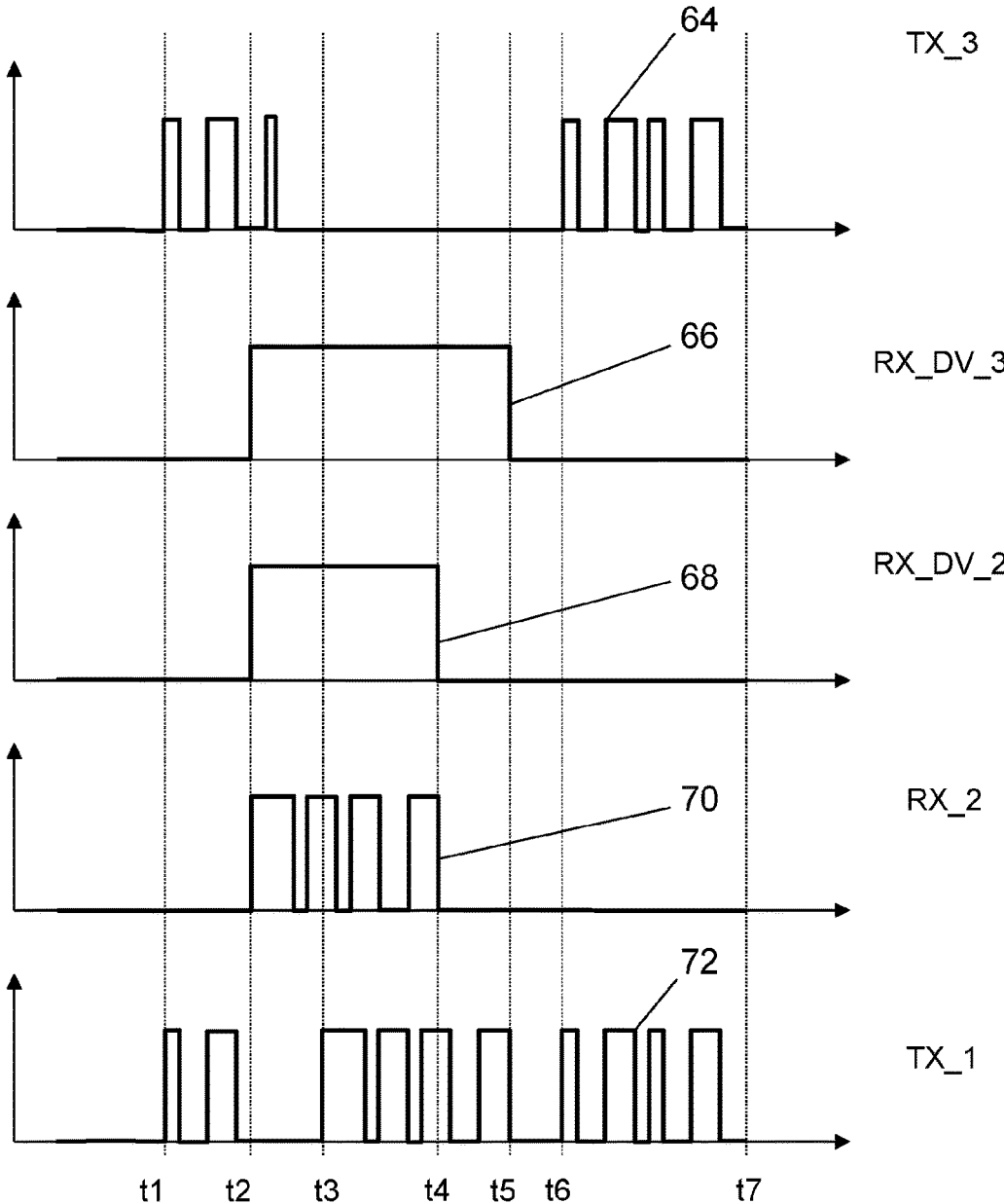
FIG. 2 shows schematic signal profiles during the forwarding of received second and third data content by the node from FIG. 1.

As long as no second data telegrams 30 are received via the second data connection 27, third data telegrams 40 received from the field device 54 via the third data connection 38 are output by the FPGA 12 via the first data connection 15 as first data telegrams 18. This changes immediately when a second data telegram 30 is received via the second data connection 27, i.e. the second PHY 28 transmits a receive signal in the form of what is known as a RX_DV signal to the second interface 26 of the FPGA 12 or the mentioned signal is received by the second interface 26. For this purpose, the FPGA 12 switches a logical switch 63, which is shown symbolically in FIG. 1. FIG. 2 shows schematic signal curves, over time, of signals relevant to the forwarding of received second and third data content by the node 10.

FIG. 2 shows:

Line 64: Signal curve when outputting a third data telegram 40 from the data interface 58 of the field device 54 to the third data connection 38 (signal TX_3), Line 66: Signal curve of a receive signal output from the third data connection 38 to the data interface 58 of the field device 54 (signal RX_DV_3), Line 68: Signal curve of a receive signal output by the second PHY 28 to the second interface 26 (signal RX_DV_2), Line 70: Signal curve upon reception of a second data telegram 30 at the second data connection 27 (signal RX_2), and Line 72: Signal curve when outputting a first data telegram 18 at the first data connection 15 (signal TX_1).

At the time t1, a third data telegram 40 begins to be received at the third data connection 38, which can be recognized by the alternating signal TX_3. The third data telegram 40 is output with a minimum time delay (not shown) at the first data connection 15, as a first data telegram 18, so that, up to a time t2, the profile of the signal TX_1 corresponds to the profile of the signal TX_3.

At the time t2, a second data telegram 30 begins to be received at the second data connection 27, which can be recognized by the alternating signal RX_2. As a result, the signal RX_DV_2 changes its state from 0 to 1. Since the forwarding of the second data content of the second data telegram 30 has priority over the forwarding of third data content of the third data telegram 40, the forwarding of third data telegram 40 is immediately interrupted at the time t2. The interruption is achieved by virtue of the FPGA 12 outputting a receive signal (signal RX_DV_3 changes from 0 to 1) via the third data connection 38 to the data interface 58 of the field device 54. Since a third data telegram 40 is simultaneously output from the data interface 58 to the third data connection 38 (signal TX_3), the data interface 58 detects a collision and breaks off the output of the third data telegram 40 according to the Ethernet protocol used. After the mentioned termination, the data interface 58 still outputs what is known as a jam signal (see peak in TX_3 between the times t2 and t3), which is, however, not forwarded by the FPGA 12 to the first data connection 15 and is therefore not output via the first data connection 15.

The second data content of the second data telegram 30 received from the time t2 is not immediately output via the first data connection 15, but is temporarily stored in the memory 37.

The output of the second data content of the second data telegram 30 from the memory 37 begins only after waiting for a period of 96 bit times, i.e. 0.92 us at the time t3, which can be recognized by the alternating profile of TX_1. The output is thus delayed by the specified time period. It is also possible for the output to be delayed a little longer, for example 1 μs.

The reception of the second data telegram 30 lasts until the time t4, after which the signal RX_2 no longer alternates. As a result, the signal RX_DV_2 changes its state from 1 to 0. Since the output of the second data content of the second data telegram 30 as the first data telegram 18 at the first data connection 15 is not yet terminated at the time t4, the signal RX_DV_3 still remains at 1, so that the data interface 58 of the field device 54 can still recognize that it must not output a third data telegram 40.

The output of the second data content of the second data telegram 30 as the first data telegram 18 at the first data connection 15 ends at the time t5, which is the specified time period after the time t4. The signal TX_1 thus corresponds, between the times t3 and t5, to the signal RX_2 between the times t2 and t4.

At the time t5, the signal RX_DV_3 changes from 1 to 0. The data interface 58 of the field device 54 thus recognizes that it may output a third data telegram 40. It begins, according to the Ethernet protocol, after waiting a random waiting time to time t6, to output the third data telegram 40 again, from the beginning, which telegram was output starting from the time t1. The output of the entire third data telegram 40 is completed at time t7. The third data telegram 40 is forwarded from the FPGA 12, after the time t6, to the first data connection 15 again, and output by it as a first data telegram 18, so that, as far as between the times t6 and t7, the profile of the signal TX_1 corresponds to the profile of the signal TX_3.

The second data content of the second data telegram 30 received via the second data connection 27 was thus forwarded as quickly as possible, without the third data content of the third data telegram 40 received via the third data connection 38 being lost.

The FPGA 12 of the node 10 is configured to perform the described method.

Figure 3:
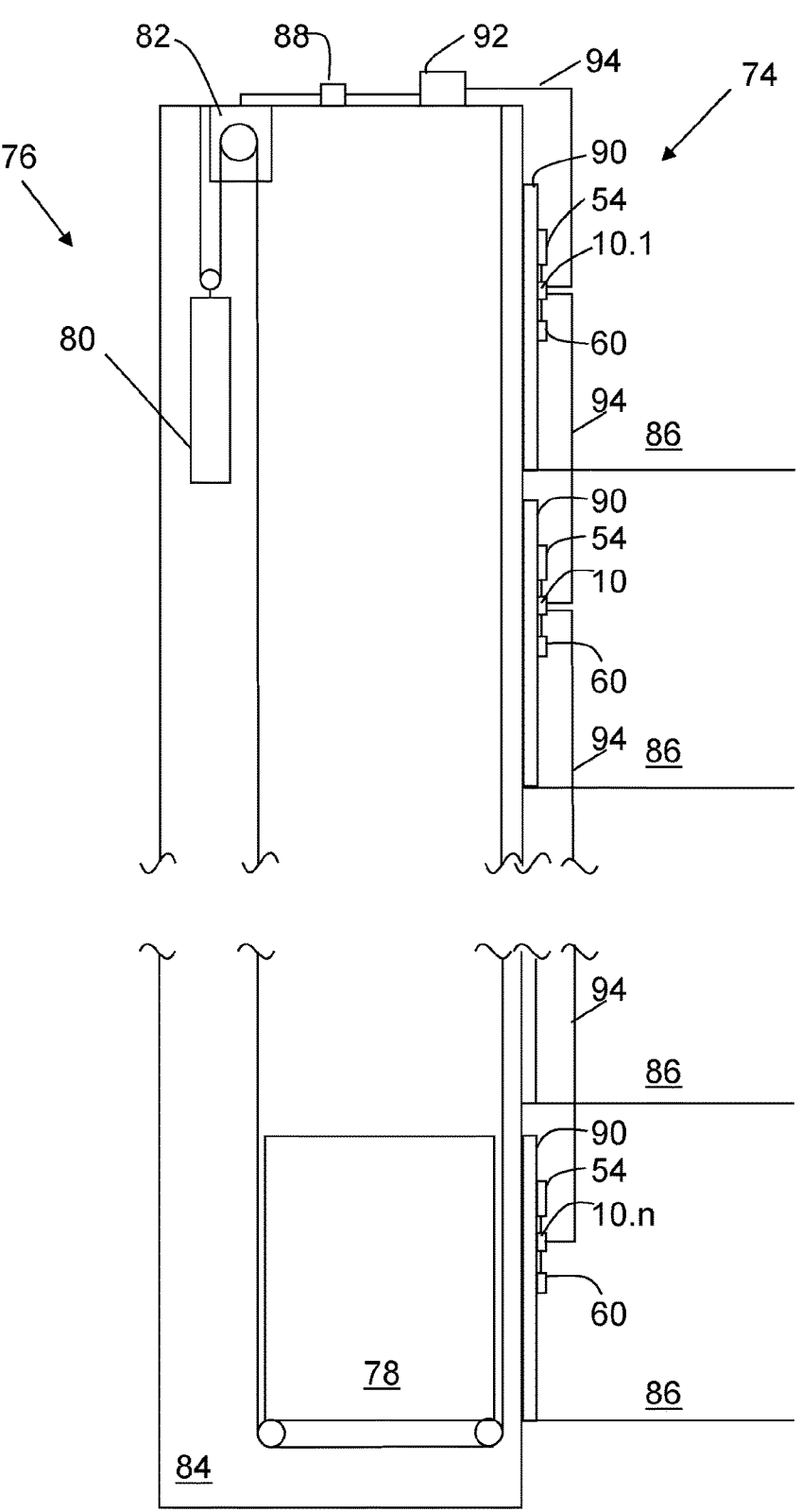
FIG. 3 shows an elevator system comprising a data network.

The node 10 described in FIG. 1, which carries out the method described, with the signal profiles of FIG. 2, can be used particularly advantageously in a data network 74 of an elevator system 76 according to FIG. 3.

In the elevator system 76, an elevator car 78 and a counterweight 80 can be displaced vertically within an elevator shaft 84 by means of a drive machine 82 and, in the process, moved to different floors 86. The operation of the drive machine 82 is controlled by an elevator controller 88. A shaft door 90 is provided on each of the floors 86, by means of which access to the elevator shaft 84 or the elevator car 78 located behind it can be blocked or released. A current closed state of each of these shaft doors 90 is monitored in each case by means of a door contact 60 provided on the respective shaft door 90. The door contact 60 is thus a safe input/output unit, shown in FIG. 1, which, depending on whether the shaft door 90 is open or closed, determines and outputs a corresponding signal or data.

Each door contact 60 is connected to a node 10 according to FIG. 1, more precisely to the fourth data connection 48 of the node 10. FIG. 3 does not further show the individual components of the nodes 10. Via its third data connection 38, each node 10 is also connected to a field device in the form of an operating unit 54 for calling the elevator car 78 and/or for inputting a destination floor. The nodes 10 are arranged one behind the other in a row, so that in the case of all nodes 10 except for a first node 10.1 and a last node 10.n the first data connection 15 is connected via an unshielded, twisted, two-core cable 94 to the second data connection 27 of a node arranged in front thereof. The nodes 10 thus form a chain extending from the first node 10.1 to the last node 10.n. The first node 10.1 is likewise connected by its first data connection 15, via an unshielded, twisted, two-core cable 94, to a master 92, which monitors the safety of the elevator system 76 and is in signal connection with the elevator controller 88. The second data connection 27 of the last node 10.n is not connected to any other device.

During operation of the elevator system 76, the master 92 outputs data telegrams to the first node 10.1 which, as described in conjunction with FIG. 1, receives the telegrams via its first data connection 15 as fifth data telegrams 20 and outputs them unchanged, to the next node 10, as sixth data telegrams 32, via its second data connection 27. If they contain data content relevant for an operating unit 54 connected to the node 10, the fifth data telegrams 20 can be output from the FPGA 12 of the node, via the third data connection 38, to the operating unit 54. This is repeated until the aforementioned data telegrams of the master 92 have been received by the last node 10.n. In response to the reception of a fifth data telegram 20 by the last node 10.n, the FPGA 12 of the last node 10.n generates a first data telegram 18, which is output via the first data connection 15. This first data telegram 18 can, but does not have to, contain data content of the received fifth data telegram 20. Information received from the door contact 60 in the form of a seventh data telegram 50 can be incorporated into the first data telegram 18. It is also possible for information to be output to the door contact 60 on the basis of the data content of the fifth data telegram 20.

As described in conjunction with FIGS. 1 and 2, the operating unit 54 connected via the third data connection 38 to the node 10.n can also output data content in the form of third data telegrams 40 to the node 10.n, which are output via the first data connection 15 as first data telegrams 18. In this case, the data telegram generated by the FPGA 12 of the last node 10.n is output having priority over the mentioned third data telegram 40. The prioritization is implemented analogously to the prioritization of forwarding of second data content of received second data telegrams 30, described in conjunction with FIGS. 1 and 2, over the forwarding of received third data telegrams 40.

The first data telegram 18 of the last node 10.n is received by the node located ahead, as the second data telegram 30, via its second data connection 27 and, as described above, forwarded to its first data connection 15 and output as the first data telegram 18. In this case, the output of the second data content of the received second data telegrams 30 takes place, as described in conjunction with FIGS. 1 and 2, in a manner having priority over the forwarding of the third data telegrams 40 received by an operating unit 54.

In the case of each node 10, information received from the door contact 60 in the form of a seventh data telegram 50 can be incorporated in the first data telegram 18 without delay. The mentioned delay-free integration of the seventh data content is realized in particular according to the method described in WO 2021/004835 A1. It is also possible for information to be output to the door contact 60 on the basis of the data content of the fifth data telegram 20.

The master 92 evaluates the safety-relevant information of the individual door contacts 60 obtained from the first node 10.1. When an error is detected, the master 92 initiates necessary measures, such as stopping the elevator system 76.

The master 92 also forwards information, in particular the information of the individual operating units 54, to the elevator controller 88. It also receives information from the elevator controller 88, which it outputs to the first node 10.1. The master 92 can moreover be connected to further electronic devices and can receive information from these devices for forwarding to the first node 10.1.

Since safety-relevant information of the door contact 60 is transmitted in the described data network 74, each node 10 requires a unique identification number. This identification number is determined or assigned when the data network 74 is initialized.

In order to enable simple and automated initialization, each node 10 can interrupt the output of fifth data telegrams 20, received at the first data connection 15, as sixth data telegrams 32, via the second data connection 27. This interruption is active when the node 10 does not yet have an identification number. If the master 92 then outputs a data telegram to the first node 10.1, this data telegram reaches only the first node 10.1 which responds to this data telegram. The master then allocates the first identification number to the first node 10.1. As a result, the first node 10.1 cancels the mentioned interruption, so that when a data telegram is transmitted again by the master 92, it is forwarded from the first node 10.1 to the second node. The second node answers the master, whereupon the second identification number is assigned to the second node. This procedure is continued until the last node 10.n has been assigned an identification number.

The door contact 60 of the elevator system does not have to be connected to the nodes. They can also be designed as switches which are part of a conventional series-connected safety circuit. In this case, the nodes do not require a fourth data connection. The first node then also does not have to be connected to a master, but rather can be connected directly to the elevator controller. The nodes then also do not require an identification number.

Finally, it should be noted that terms such as "having," "comprising," etc. do not preclude other elements or steps, and terms such as "a" or "an" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for forwarding data content from a second data connection and a third data connection of a node of a data network of an elevator system to a first data connection of the node, wherein the node operates to output a first data telegram that forms first data content via the first data connection according to a selected Ethernet protocol, receive a second data telegram that forms second data content via the second data connection according to the Ethernet protocol, receive a third data telegram that forms third data content via the third data connection according to the Ethernet protocol, derive the first data telegram either from the second data telegram or the third data telegram, and receive seventh data content via a fourth data connection of the node, the method comprising the steps of:

interrupting forwarding of the third data content received via the third data connection when reception of the second data telegram via the second data connection is detected;

conducting the received second data telegram into an intermediate buffer;

delaying output from the intermediate buffer of the second data content received via the second data connection, via the first data connection, for a definable time period; and delay-free integration of the seventh data content received when forwarding the second data content, received via the second data connection, to the first data connection in the first data telegram output via the first data connection.

2. The method according to claim 1 including at least one of:

the output of the first data telegram at the first data connection and the receiving of the second data telegram at the second data connection and the third data telegram at the third data connection proceed at a same transmission rate; and the definable time period corresponds at least to a minimum waiting time of the Ethernet protocol associated with the first data connection and the second data connection.

3. The method according to claim 1 wherein the third data connection either receives the third data telegram or outputs a fourth data telegram at any point in time.

4. The method according to claim 3 wherein the third data connection is connected to a first external data interface of a first field device for data transmission, and including the steps of:

when interrupting the forwarding of the third data content received via the third data connection, as soon as the reception of the second data telegram via the second data connection is detected, outputting a receive signal via the third data connection to the first external data interface, the signal indicating the output of the fourth data telegram from the third data connection to the first external data interface; and whereby a collision according to the Ethernet protocol, in data transmission between the third data connection and the first external data interface, is detected in accordance with the Ethernet protocol, and stopping the data transmission at the third data connection.

5. The method according to claim 4 wherein a jam signal transmitted from the first external data interface to the third data connection in accordance with the Ethernet protocol, the jam signal indicating a collision in the data transmission between the third data connection and the first external data interface, is not output via the first data connection.

6. The method according to claim 1 wherein the first data connection operates to simultaneously receive a fifth data telegram when outputting the first data telegram, the second data connection operates to simultaneously output a sixth data telegram when receiving the second data telegram, and the fifth data telegram received via the first data connection is output without changes as the sixth data telegram via the second data connection.

7. The method according to claim 1 wherein the definable time period is at least 96 bit times.

8. A method for communicating data content within a data network in an elevator system, the data network including:

a plurality of nodes connected to one another via a data communication path, each of the nodes having a first respective data connection and a second respective data connection adapted to exchange data telegrams forming data content between the nodes;

wherein the nodes are connected to one another in series in the data communication path via the first data connections and the second data connections to form a chain extending from a first of the nodes to a last of the nodes;

wherein at least two of the nodes are each connected via a respective third data connection to an associated first external data interface of a respective field device and via a respective fourth data connection to a respective safe input/output unit for data transmission; and wherein each respective one of the at least two nodes perform the method according to claim 1 to forward a second data content received by the respective second data connection, a third data content received by the respective third data connection, and a fourth data content received by the respective fourth data connection to the respective first data connection.

9. The method according to claim 8 wherein for each of the at least two nodes the first data connection simultaneously receives a fifth data telegram in addition to outputting the first data telegram, the second data connection simultaneously outputs a sixth data telegram in addition to receiving the second data telegram, and a fifth data telegram received via the first data connection is output without changes as a sixth data telegram via the second data connection.

10. The method according to claim 8 wherein the seventh data content received via the fourth data connection, when forwarding the second data content received via the second data connection to the first data connection, is integrated without delay into the first data telegram output via the first data connection.

11. A node of a data network, the node comprising:

a first data connection, a second data connection, a third data connection, a fourth data connection and an intermediate buffer; and wherein the node is adapted to output a first data telegram, forming first data content, via the first data connection according to a selected Ethernet protocol, receive a second data telegram, forming second data content, via the second data connection according to the selected Ethernet protocol, receive a third data telegram, forming third data content, via the third data connection according to the selected Ethernet protocol, receive seventh data content via the fourth data connection, derive the first data telegram either from the second data telegram or from the third data telegram, interrupt forwarding of the third data content received via the third data connection upon detecting reception of the second data telegram via the second data connection, route the received second data telegram into the intermediate buffer, delay the outputting of the second data content, received via the second data connection, from the intermediate buffer via the first data connection for a definable time period, and integrate the received seventh data content, when forwarding the second data content to the first data connection, delay-free into the first data telegram output via the first data connection.

12. A data network of an elevator system, the data network comprising:

a plurality of nodes connected to one another via a data communication path, each of the nodes having a first data connection and a second data connection, to exchange data telegrams forming data content between the nodes;

wherein the nodes are connected to one another in series via the data communication path using the first data connections and the second data connections to form a chain extending from a first of the nodes to a last of the nodes; and wherein at least two of the nodes are formed as the node according to claim 11.

13. An elevator system comprising:

a data network according to claim 12;

a plurality of door contacts, each of the door contacts monitoring a current closed state of an associated elevator shaft door at a different floor along an elevator shaft;

a plurality of operating units, each of the operating units being at one of the floors and adapted to call an elevator car and/or input a destination floor; and wherein each of the door contacts and each of the operating units is connected to one of the nodes.

* * * * *